US006683844B2

United States Patent
Kuroda (10) Patent No.: US 6,683,844 B2
(45) Date of Patent: Jan. 27, 2004

(54) OPTICAL DISC HAVING EMBOSS PITS IN THE CONTROL DATA ZONE

(75) Inventor: Kazuo Kuroda, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 220 days.

(21) Appl. No.: 09/759,236

(22) Filed: Jan. 16, 2001

(65) Prior Publication Data

US 2001/0008516 A1 Jul. 19, 2001

(30) Foreign Application Priority Data

Jan. 14, 2000 (JP) .................................... P2000-007153

(51) Int. Cl.⁷ ................................................ G11B 7/24
(52) U.S. Cl. ............................... 369/275.2; 369/275.4; 428/64.4
(58) Field of Search .......................... 369/275.2, 275.4, 369/275.3, 13.55; 428/64.1, 64.2, 64.4; 430/270.13

(56) References Cited

U.S. PATENT DOCUMENTS 5,923,640 A * 7/1999 Takemura et al. ........ 369/275.3
6,118,756 A * 9/2000 Masuhara et al. ........ 369/275.4
6,301,208 B1 * 10/2001 Sugaya et al. ............. 369/47.1
6,504,800 B1 * 1/2003 Kuwahara et al. ........ 369/275.4

FOREIGN PATENT DOCUMENTS

| EP | 0 784 313 A2 | 7/1997 |
| EP | 0 798 712 A2 | 10/1997 |
| EP | 1 054 399 A1 | 11/2000 |
| EP | 1 102 248 A1 | 5/2001 |

OTHER PUBLICATIONS

Japanese Abstract No. 61 123026 dated Jun. 10, 1986.

* cited by examiner

Primary Examiner—Tan Dinh
(74) Attorney, Agent, or Firm—Sughrue Mion, PLLC (57) ABSTRACT

A recordable optical disc (100) is provided with a disc substrate (110); a record track (102) formed on the disc substrate spirally or coaxially around a center of the disc substrate; and an emboss pit formed in a predetermined zone on the disc substrate in correlation with predetermined data, which is recorded on the record track in the predetermined zone.

30 Claims, 10 Drawing Sheets

OPTICAL DISC HAVING EMBOSS PITS IN THE CONTROL DATA ZONE

BACKGROUND OF THE INVENTION

1. Field of the Invention

The present invention relates to a recordable optical disc and a method of recording data on the recordable optical disc, which can improve a protection of the recorded data.

2. Description of the Related Art

There are various types of optical discs because of the diversification of formats of the CDs (Compact Discs) and the introduction of the DVD.

According to the formats of the CDs, there are a read only type CD-ROM (CD-Read Only) on which data can be read many times but cannot be written, a write once type CD-R (CD-Recordable) on which data can be read many times and can be written only once, and a CD-RW (CD Rewritable) on which data can be read many times and can be written many times. According to the formats of the DVDs, there are a read only type DVD-ROM (DVD Read Only) on which data can be read many times but cannot be written, a write once type DVD-R (DVD-Recordable) on which data can be read many times and can be written only once, a re-recordable type DVD-RW (DVD Re-recordable) on which data can be read many times and can be written for limited times, and a rewritable type DVD-RAM (DVD Rewritable) on which data can be read many times and can be written many times.

By the way, in a control data zone of the DVD-ROM, information important only for the DVD-ROM is written. In a zone, whose position is the same as this control data zone, of the DVD-RW, an unreadable emboss is formed or buried to thereby disable both of reading and writing in this zone, in order to prevent the falsification or manipulation of the data. Therefore, the control data is written on the DVD-RW, in a zone different from that of the DVD-ROM.

However, if such a probability is considered that important information, which is common for the DVD-ROM and the DVD-RW and is not desired to be falsified or manipulated, is commonly written on the DVD-ROM and the DVD-RW, it will be required or convenient to record such important information in the same zones on those discs.

SUMMARY OF THE INVENTION

It is therefore an object of the present invention to provide a recordable optical disc and a method of recording data on the recordable optical disc, which can prevent the data recorded in a predetermined zone on the recordable optical disc from being falsified.

The above object of the present invention can be achieved by a recordable optical disc provided with: a disc substrate; a record track formed on the disc substrate spirally or coaxially around a center of the disc substrate; and an emboss pit formed in a predetermined zone on the disc substrate in correlation with predetermined data, which is recorded on the record track in the predetermined zone.

According to the recordable optical disc of the present invention, since the data pattern of the predetermined data is known in advance, the emboss pit is formed in the predetermined zone in correlation with the predetermined data to be recorded in the predetermined zone. Then, the predetermined data is recorded in the predetermined zone where the emboss pit is formed. On one hand, although there exists the emboss pit in the predetermined zone, it is possible to normally write and read the predetermined data since the predetermined data is in correlation with the emboss pit. On the other hand, data other than the predetermined data cannot be normally written onto or read from the predetermined zone since such data other than the predetermined data are not in correlation with the emboss pit. Namely, even if it is attempted to falsify the predetermined data, a record mark and a record space of such data other than the predetermined data are probably influenced by the existence of the emboss pit, which most likely appears at the boundary between the record mark and the record space and which significantly drifts the signal level in the middle of the record mark and/or the record space.

In this manner, by forming the emboss pit, which is in correlation with the predetermined data, in the predetermined zone in advance, the reflection coefficient is intentionally decreased by the existence of the emboss pit. Therefore, the operation of falsifying the predetermined data is most likely failed due to the decrease of the reflection coefficient, while the predetermined data can be normally written and read against the decrease of the reflection coefficient.

In one aspect of the recordable optical disc of the present invention, the emboss pit is formed such that the emboss pit does not exist at a boundary between a record mark and a record space of the predetermined data.

According to this aspect, the emboss pit does not exist at the boundary between the record mark and the record space of the predetermined data. Namely, the length of the emboss pit along the record track is shorter than the length of the record mark or record space along the record track. Thus, the predetermined data can be normally written onto and read from the predetermined zone against the decrease of the reflection coefficient caused by the emboss pit.

In another aspect of the recordable optical disc of the present invention, the emboss pit is formed at a position where a length of a record mark of the predetermined data along the record track is equal to or longer than a predetermined length.

According to this aspect, since the emboss pit is formed at a position where the length of the record mark is equal to or longer than a predetermined length (e.g., 8 T, 4 T or the like, wherein T denotes a base clock cycle), it is possible to surely prevent the predetermined data from being falsified, by forming the emboss pit having a certain length (e.g., 4 T, 2 T or the like) which is shorter than that of the record mark but is longer than the base clock cycle.

In this aspect, a length of the emboss pit may be constant regardless of the length of the record mark.

By constructing in this manner, it is possible to easily form the emboss pit.

Alternatively in this aspect, a length of the emboss pit may be variable depending upon the length of the record mark.

By constructing in this manner, it is possible to keep a certain margin of the emboss pit with respect to the edges of the record mark, the length of which is variable. Namely, the emboss pit is made long if the record mark is long, while the emboss pit is made short if the record mark is short, so that an appropriate margin of the emboss pit is kept.

In another aspect of the recordable optical disc of the present invention, the emboss pit is formed at a position where a length of a record space of the predetermined data along the record track is equal to or longer than a predetermined length.

According to this aspect, since the emboss pit is formed at a position where the length of the record space is equal to or longer than a predetermined length (e.g., 8 T, 4 T or the like), it is possible to surely prevent the predetermined data from being falsified, by forming the emboss pit having a certain length (e.g., 4 T, 2 T or the like) which is shorter than that of the record space but is longer than the base clock cycle.

In this aspect, a length of the emboss pit may be constant regardless of the length of the record space.

By constructing in this manner, it is possible to easily form the emboss pit.

Alternatively in this aspect, a length of the emboss pit may be variable depending upon the length of the record space.

By constructing in this manner, it is possible to keep a certain margin of the emboss pit with respect to the edges of the record space, the length of which is variable. Namely, the emboss pit is made long if the record space is long, while the emboss pit is made short if the record space is short, so that an appropriate margin of the emboss pit is kept.

In another aspect of the recordable optical disc of the present invention, a plurality of emboss pits each having a structure same as the emboss pit are formed in the predetermined zone.

According to this aspect, since a plurality of emboss pits are formed in the predetermined zone, it is possible to more reliably prevent the predetermined data from being falsified.

In this aspect, a first emboss pit of the emboss pits may be formed at a position where a length of a record mark of the predetermined data along the record track is equal to or longer than a predetermined length and a second emboss pit of the emboss pits may be formed at a position where a length of a record space of the predetermined data along the record track is equal to or longer than the predetermined length By constructing in this manner, since the first emboss pit is formed at a position where the length of the record mark is equal to or longer than a predetermined length (e.g., 8 T, 4 T or the like) and since the second emboss pit is formed at a position where the length of the record space is equal to or longer than a predetermined length (e.g., 8 T, 4 T or the like), it is possible to surely prevent the predetermined data from being falsified, by forming the emboss pit having a certain length (e.g., 4 T, 2 T or the like) which is shorter than that of the record mark or space but is longer than the base clock cycle.

Further in such a structure, a length of the first emboss pit along the record track may be variable depending upon the length of the record mark and a length of the second emboss pit along the record track may be variable depending upon the length of the record space.

By constructing in this manner, it is possible to keep certain margins of the first and second emboss pits with respect to the edges of the record mark and space respectively. Namely, the first emboss pit is made long if the record mark is long, while the first emboss pit is made short if the record mark is short, so that an appropriate margin of the first emboss pit is kept. On the other hand, the second emboss pit is made long if the record space is long, while the second emboss pit is made short if the record space is short, so that an appropriate margin of the second emboss pit is kept.

In the aspect in which a plurality of emboss pits are formed in the predetermined zone, a length of each of the emboss pits along the record track may be constant.

By constructing in this manner, it is possible to easily form the emboss pits.

In another aspect of the recordable optical disc of the present invention, the predetermined zone is in a control data zone, and the predetermined data is control data to control a recording and/or reproducing operation of data recorded on the record track in a data record zone, which is different from the predetermined zone and where the emboss pit is not formed.

According to this aspect, the control data recorded in the control data zone can be prevented from being falsified. The data such as video data, audio data or the like, in the data record zone can be recorded and/or reproduced in accordance with the control data.

In this aspect, the control data zone may be within a lead in area.

By constructing in this manner, the control data in the control data zone in the lead in area can be prevented from being falsified.

In another aspect of the recordable optical disc of the present invention, data other than the predetermined data is recorded on the record track in a data record zone, which is different from the predetermined zone and where the emboss pit is not formed.

According to this aspect, it is possible to normally record and reproduce the data in the data record zone, where the emboss pit is not formed.

In another aspect of the recordable optical disc of the present invention, the recordable optical disc is further provided with a record layer, which is formed on the disc substrate and by which data including the predetermined data is recorded on the record track.

According to this aspect, the data including the predetermined data such as control data etc., as well as video data, audio data etc., can be surely recorded on the record track by virtue of the record layer.

In this aspect, the record layer may comprise a material capable of a recording operation of write many times type.

By constructing in this manner, a write many type optical disc such as a DVD-RAM or the like can be realized.

Alternatively in this aspect, the record layer may comprise a material capable of a recording operation of write once type.

By constructing in this manner, a write once type optical disc such as a DVD-R or the like can be realized.

Further alternatively in this aspect, the record layer may comprise a material capable of a recording operation of write limited times type.

By constructing in this manner, a write many type optical disc such as a DVD-RW or the like can be realized.

In another aspect of the recordable optical disc of the present invention, the recordable optical disc is further provided with a reflective layer formed on the disc substrate for reflecting a light beam for a recording and/or reproducing operation of data recorded on the record track.

According to this aspect, the data including the predetermined data such as control data etc., as well as video data, audio data etc., can be surely recorded and/or reproduced on the record track by virtue of the reflective layer, which reflects a laser beam for a recording and/or reproducing operation.

The above object of the present invention can be also achieved by a method of recording data on the above described recordable optical disc of the present invention (including its various aspects). The method is provided with: a process of forming the emboss pit on the disc substrate;

and a process of recording the predetermined data in the predetermined zone.

According to the method of the present invention, the emboss pit is formed in advance in the predetermined zone in correlation with the predetermined data to be recorded in the predetermined zone. Then, the predetermined data is recorded in the predetermined zone where the emboss pit is formed. Therefore, the operation of falsifying the predetermined data is most likely failed due to the decrease of the reflection coefficient caused by the emboss pit, while the predetermined data can be normally written and read against the decrease of the reflection coefficient caused by the emboss pit.

In one aspect of the method of the present invention, the method is further provided with a process of recording data other than the predetermined data in a data record zone, which is different from the predetermined zone and where the emboss pit is not formed.

According to this aspect, after the predetermined data is recorded in the predetermined zone such as a control zone in a lead in area, the data such as video data, audio data or the like other than the predetermined data is recorded in the data record zone, by a user at home for example. Accordingly, the data in the data record zone can be recorded and/or reproduced in accordance with the predetermined data in the predetermined zone, which is not falsified.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

Figure 1A:
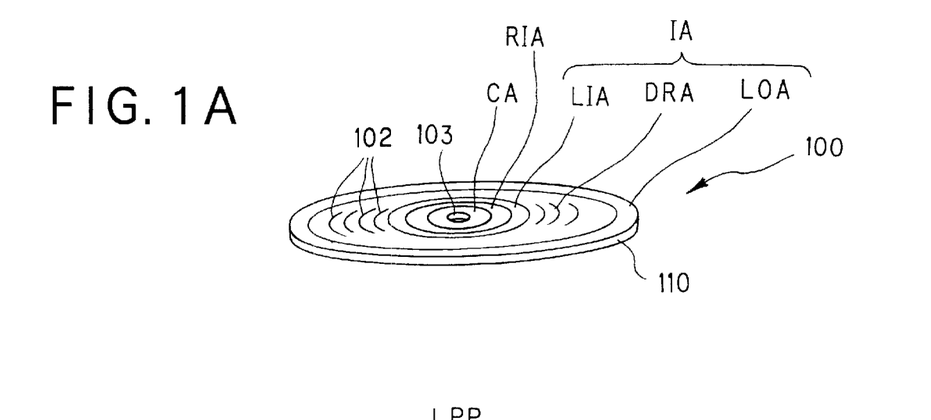
FIG. 1A is a perspective view of the DVD used in embodiments of the present invention.

In FIG. 1A, a DVD 100 is provided with a transparent substrate 110 having a center hole 103 and record tracks 102 spiral or coaxial around the center hole 103. From the inner circumferential side toward the outer circumferential side on the DVD 100, there are formed: a clamping area CA which is clamped by a damper when the DVD 100 is set to an information recording and/or reproducing apparatus; a record information area RIA; and an information area IA. In the information area IA, there are formed a lead in area LIA, a data recordable area DRA and a lead out area LOA in this order from the inner circumferential side. The record tracks 102 are formed in the record information area RIA as well as the information area IA.

Figure 1B:
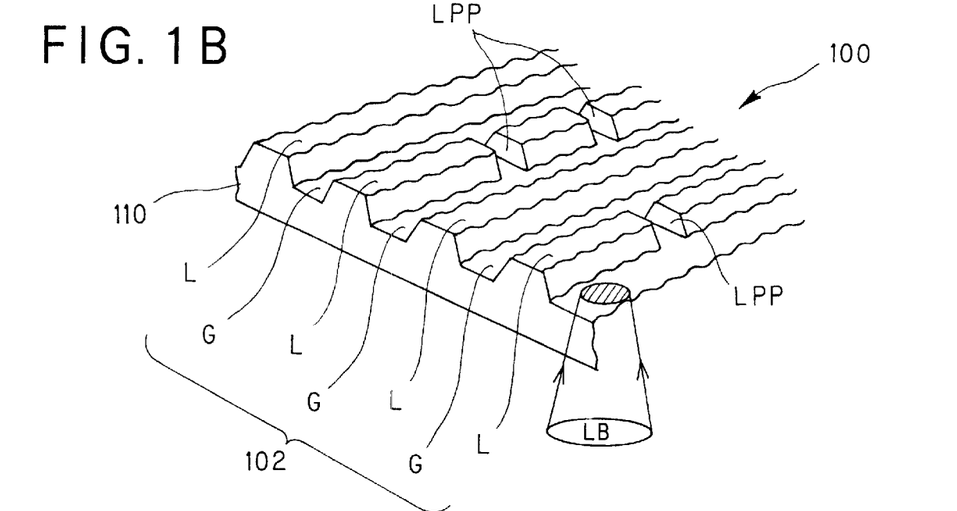
FIG. 1B is a magnified partial perspective view of a transparent substrate of the DVD in FIG. 1A at a portion including record tracks.

As shown in FIG. 1B, the record tracks 102 consists of (i) a land track L comprising a land, which is convex on the transparent substrate 110 and is concave with respect to a laser beam LB for a reading operation and/or a writing operation, and (ii) a groove track G comprising a groove, which is concave on the transparent substrate 110 and is convex with respect to the laser beam LB. On the land track L, a land pre-pit LPP is formed. The groove track G is wobbled at a predetermined frequency. The land pre-pit LPP is used to define the physical address on the record track 102.

On the basis of the information indicated by the land pre-pit LPP, a position of an optical pickup in the information recording and/or reproducing apparatus is controlled, so that the operation of recording record data onto the groove track G (i.e., a data writing operation) and the operation of reproducing the record data from the groove track G (i.e., a data recording operation) are performed. The record data and/or the control data to control the recording and/or reproducing the recording data may be recorded on the land track L in place of or in addition to the groove track G.

Figure 1C:
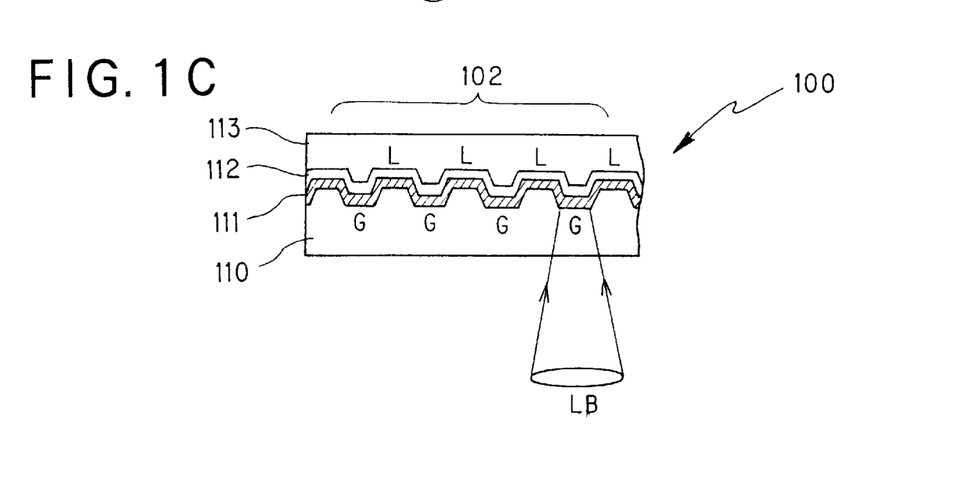
FIG. 1C is a partial sectional view of the DVD in FIG. 1A at a portion including the record tracks.

As shown in FIG. 1C, on the transparent substrate 110, a record layer 111, a light reflective layer 112 and a protection layer 113 are laminated. The record layer 111 may comprise a dye e.g., a material whose optical property is changed when a writing laser beam which is stronger than a reading laser beam is irradiated, in case of the DVD-R. Alternatively, the record layer 111 may comprise a phase-change material e.g., a material whose phase is changed between a crystalloid phase and an amorphous phase depending upon the irradiation condition of the laser beam, in case of the DVD-RAM.

Figure 1D:
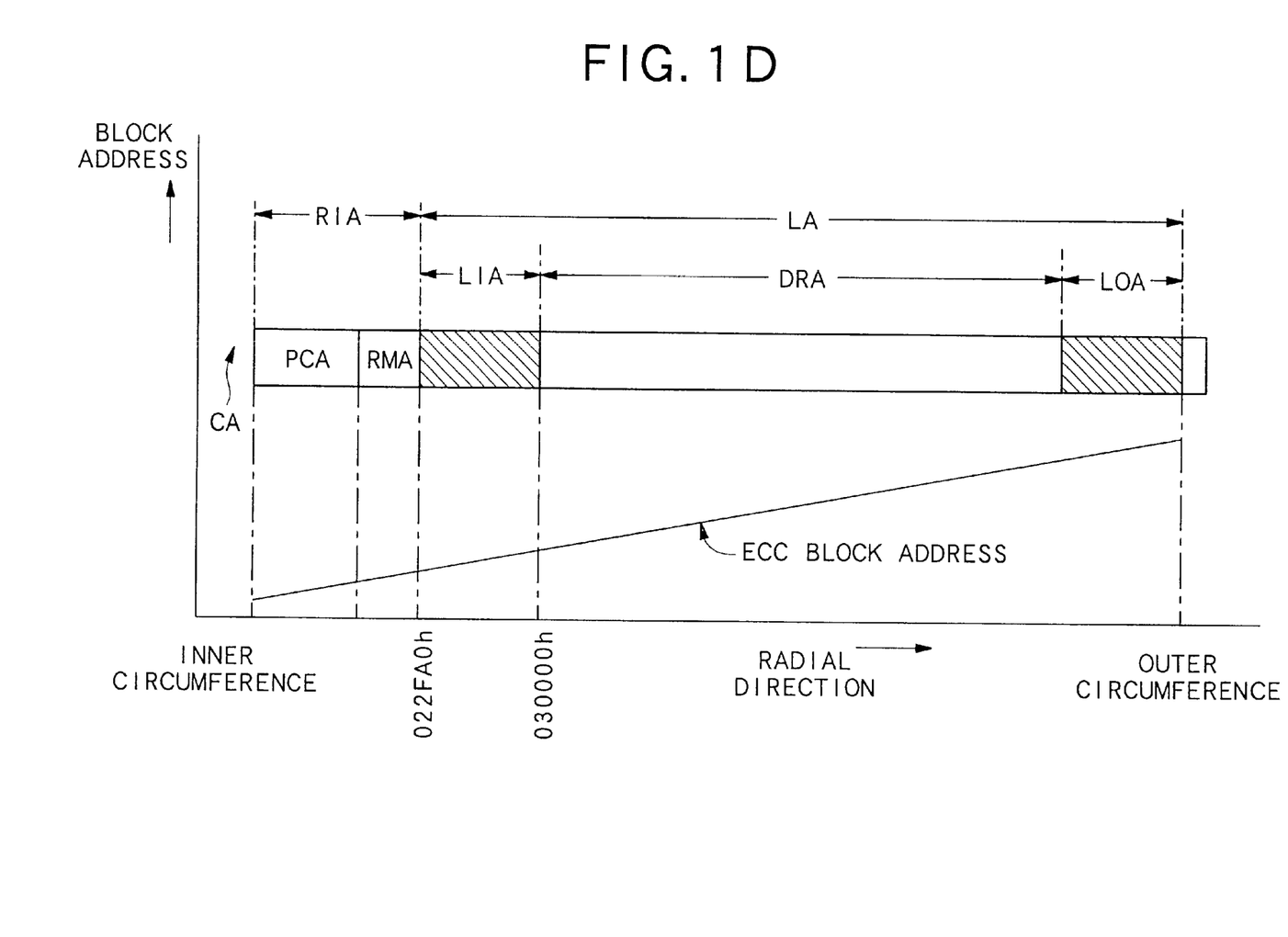
FIG. 1D is a diagram schematically showing a data structure of the DVD used in the embodiments.

FIG. 1D schematically shows a data structure of the DVD 100.

In FIG. 1D, the record information area RIA comprises a power calibration area PCA and a recording management area RMA. The information area IA comprises the lead in area LIA, the data recordable area DRA and the lead out area LOA.

In the data recordable area DRA, (i) various content data (which is referred to as "main data" hereinafter) such as audio data, video data and the like, and (ii) file management information to manage each main data as a file are recorded.

The power calibration area PCA is prepared in order to adjust the light amount of the optical pickup etc., to thereby perform the data writing operation in an appropriate operation status, by performing the trial data writing operation etc., when performing the data writing operation in the information recording and reproducing apparatus.

In the recording management area RMA, the test result data as for the power calibration area PCA is recorded.

In the lead in area LIA, the record management data indicative of the physical information of the disc is recorded.

The lead out area LOA is formed at an end position of the main data recorded in the data recordable area DRA. In the lead out area LOA, the data of (00)h is recorded. The start position of recording the lead out area LOA is changed depending upon the data amount of the main data.

The areal addresses of those areas PCA, RIA, LIA, DRA and LOA and the record addresses of the data are set in accordance with the ECC block address recorded in the land pre-pit LPP.

Figure 2:
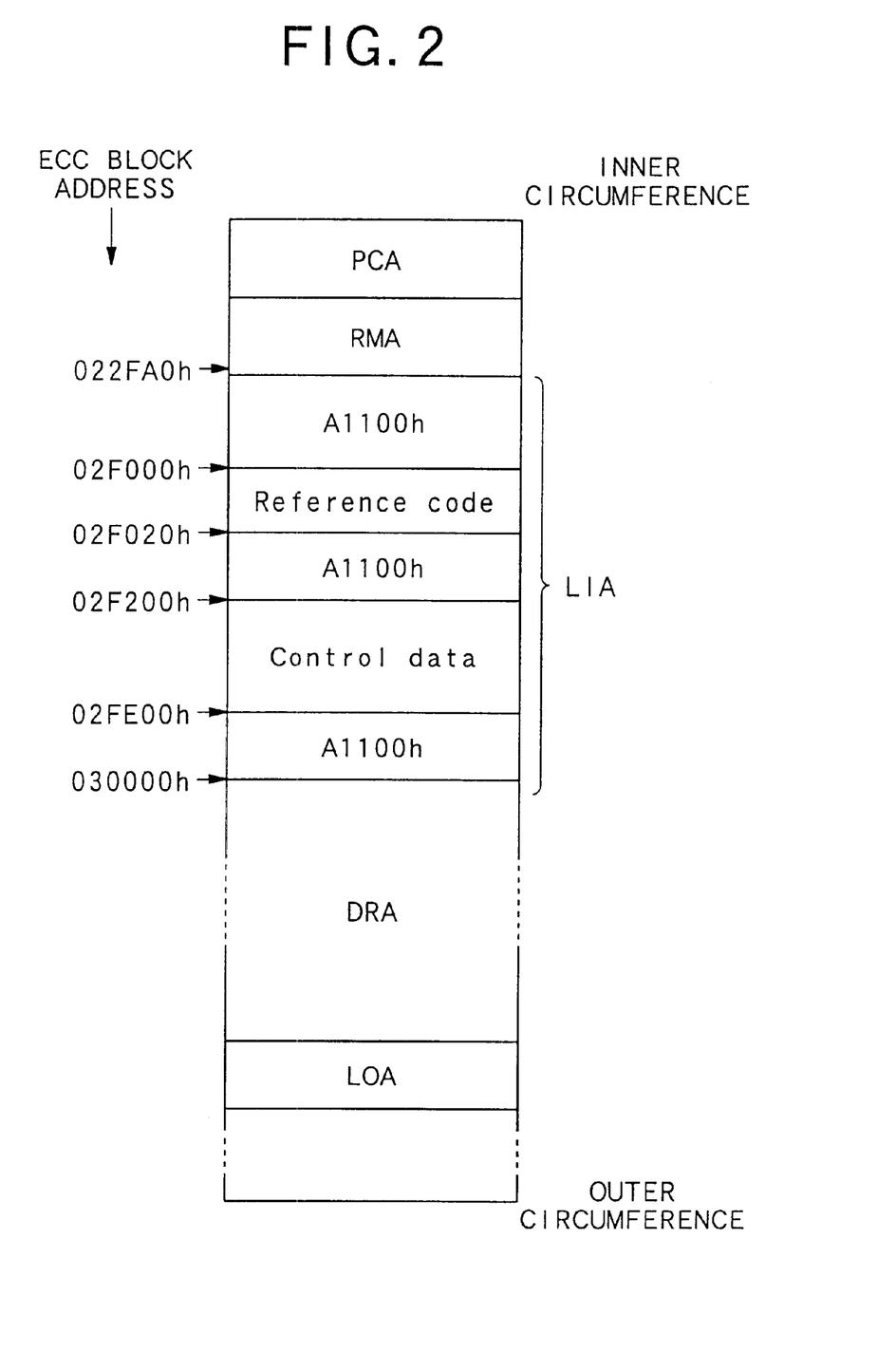
FIG. 2 is a diagram showing a detailed structure of a lead in area shown in FIG. 1D.

FIG. 2 shows the details of the lead in area LIA and the lead out area LOA.

In FIG. 2, an initial zone is formed at a start position of the lead in area LIA. The data of (00)h indicative of a blank is set to this initial zone. Following this initial zone, a reference code zone is formed. The channel bit pattern (3 T-6 T-7 T) is recorded in this reference code zone. Code words are repeatedly recorded which are in the conversion table set in advance as the channel bit pattern. On the basis of this channel bit pattern, the equalizer for the HF signal is adjusted. Following this reference code zone, a buffer zone of (00)h is formed.

In a control data zone, a DVD format type of the pertinent DVD (e.g., the DVD-ROM, the DVD-RAM, the DVD-RW or the like), a part version, a disc size, a minimum reading out rate, a disc structure (e.g., one layer ROM disc, one layer RAM disc, two layers ROM/RAM disc or the like), a recording density, a data area allocation, a burst cutting area presence or absence, a start sector of the border zone and so forth are recorded.

One portion of this control data zone is also assigned as a zone, where the information important only for the DVD-ROM is recorded. Following to this control data zone, a buffer zone of (00)h is formed.

Figure 3A:
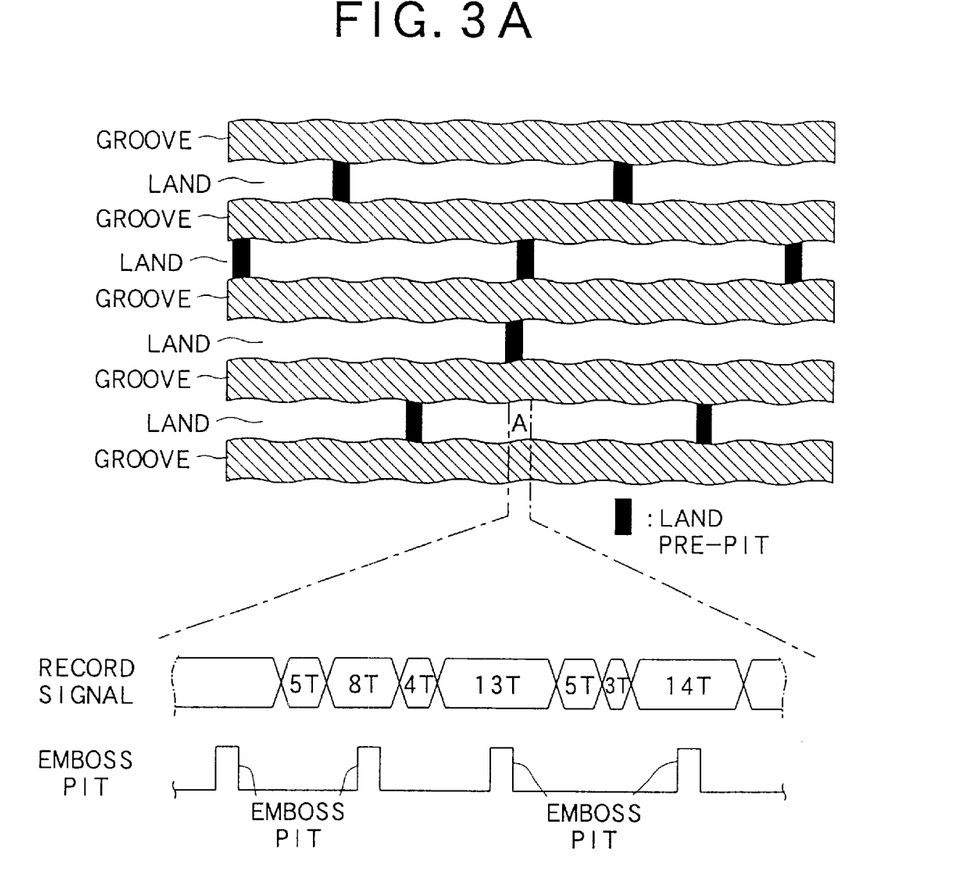
FIG. 3A is a diagram showing a basic principle of a recording method of the embodiments.

FIG. 3A shows the basic principle of the optical disc recording method of the present invention. In FIG. 3A, the groove track, the land track and the land pre-pit of the DVD-RW is schematically illustrated along a time axis at an upper portion of the figure while a timing chart of the record signal as well as the emboss pit is illustrated at an lower portion of the figure in correspondence with the upper portion of the figure.

As shown in FIG. 3A, in case of the DVD-RW, the land pre-pit method is employed as the track format. The record data is recorded by irradiating the laser beam onto the groove track. The ECC block address is recorded in advance by forming the land pre-pit on the land track.

In FIG. 3A, the land pre-pit is indicated by each black rectangular portion on the land track, while the groove track is indicated by each hatched area. The record signal and the emboss pit with regard to a small zone A on the groove track are magnified and illustrated as the timing chart at the lower portion of FIG. 3A.

Figure 3B:
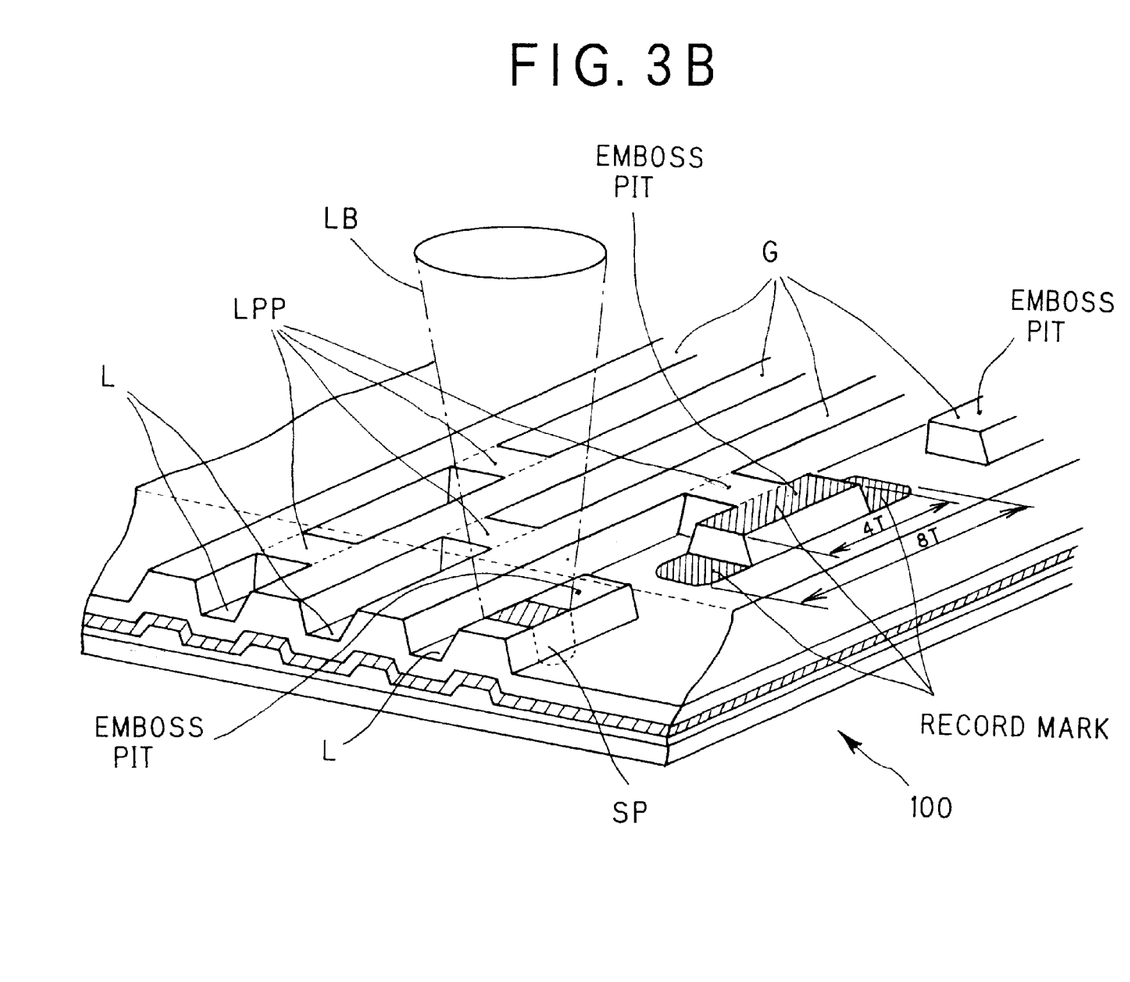
FIG. 3B is a magnified partial perspective view of the DVD showing the basic principle of the recording method of the embodiments.

As shown in FIG. 3B, in the DVD 100 (e.g., the DVD-RW) of the present embodiment, the emboss pits are formed as intermittent groove tracks separated by portions of the transparent substrate at an approximately same level as the land track L, in the control data zone. Namely, in the control data zone of the DVD 100, the emboss pit is convex on the groove track with respect to the light beam LB. Thus, the reflection coefficient of the groove track G is decreased at the emboss pit. In FIG. 3B, the proper record mark (which is originally and properly recorded) is recorded in synchronization with the emboss pit so that the detection of this proper record mark is not practically influenced by the emboss pit. In contrast, the detection of the falsified record mark (which is falsified and is not in synchronization with the emboss pit) is certainly influenced by the emboss pit, as described later in detail with referring to FIG. 4 to FIG. 7.

Incidentally in FIG. 3B, the wobble of the groove track G is omitted for the sake of simplicity, and a light spot SP whose diameter is larger than the width of the groove track G is formed of the light beam LB.

In the present embodiment, since the data pattern for the data important only for the DVD-ROM, which is not desired to be falsified, is determined in advance, the emboss pit is formed (buried) in synchronization with this important data. Therefore, although the reflection coefficient is decreased due to the existence of the emboss pit when the laser beam is irradiated in case of the DVD-RW, the important data which is recorded in synchronization with the emboss pit is not influenced when it is read out. The important data can be written in such a manner that it can be normally read out, since it is in synchronization with the emboss pit. In contrast, if it is attempted to falsify the important data, since the falsified pattern is not in synchronization with the emboss pit any more, the data cannot be normally read out. Namely, the important data cannot be falsified in such a manner that it can be normally read out since it is not in synchronization with the emboss pit.

Further, by forming the emboss pit at a central portion of the record mark or record space whose length along the record track is to be relatively long, even if the start or end position of writing the data by the laser beam is slightly shifted, a harmful influence is hardly introduced. In the present embodiments, the emboss pit is formed at the central portion of the record mark and/or the record space where the record pulse width is equal to or wider than about 8 T (wherein T denotes a basic clock cycle). As shown in the lower portion of FIG. 3A, the emboss pit is formed with respect to each of the record signals having the lengths of 8 T, 13 T and 14 T.

Further, if the emboss pit does not have a certain length along the record track, a probability that the edge of the falsified data crosses over the emboss pit to thereby give a certain influence is decreased, resulting in that the falsified data may be normally read out. Namely, the falsification is successful. Therefore, the emboss pit having a length of about 4 T is formed with respect to each of the record signals each having the length equal to or longer than 8 T in the present embodiments.

Figure 4:
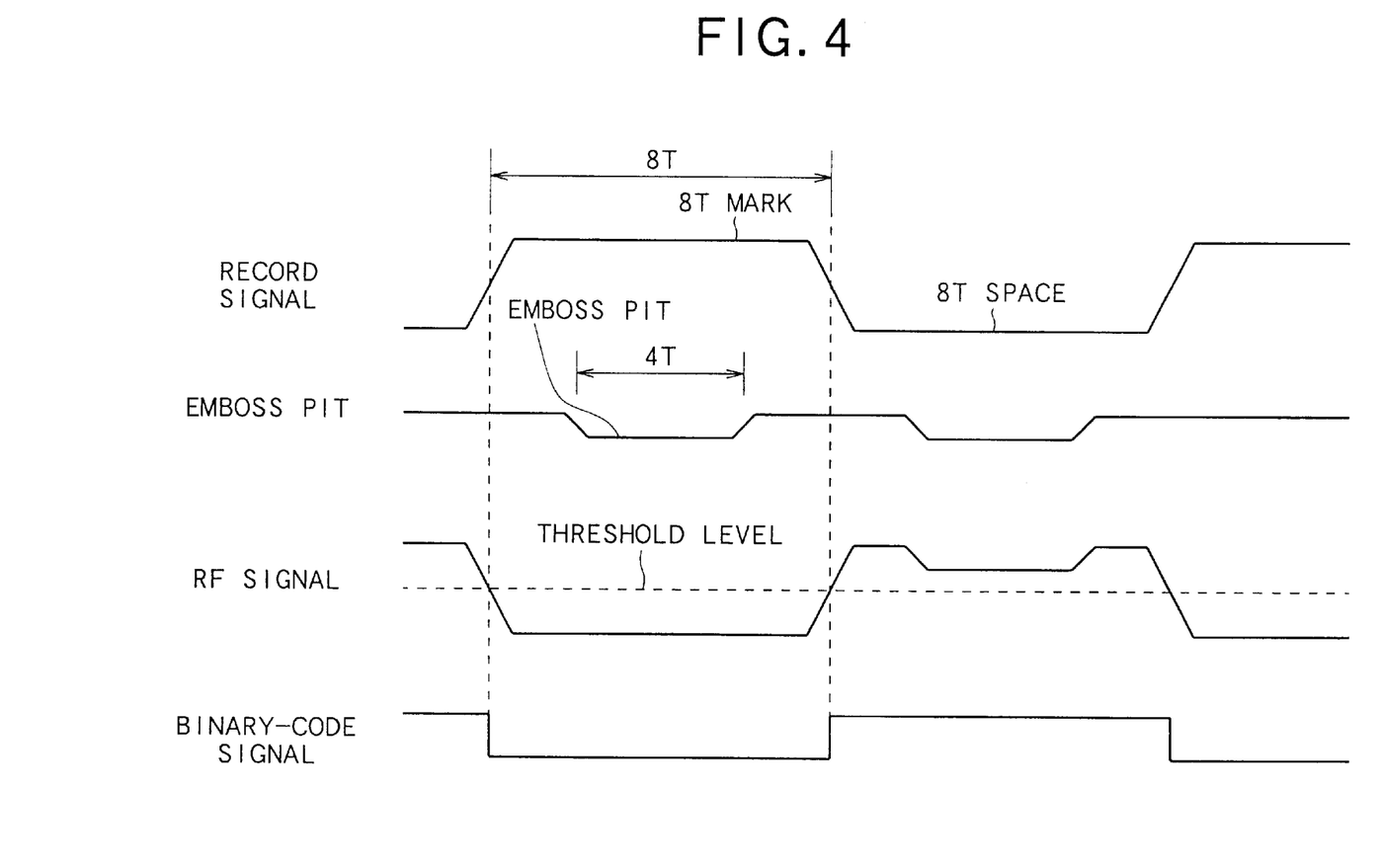
FIG. 4 is a timing chart in one operational example of the recording method in a first embodiment.

FIG. 4 shows the timing chart shown in FIG. 3A, in more detail, of the recording method in a first embodiment of the present invention.

Namely, in FIG. 4, the signal waveforms of the record signal, the emboss pit, the RF signal and the binary-coded signal in such a condition that the emboss pit is formed in both of the record mark having the length of 8 T along the record track (hereinafter, it is simply referred to as the "8 T mark") and the record space having the length of 8 T along the record track (hereinafter, it is simply referred to as the "8 T space") are shown. The emboss pit may be embossed on the transparent substrate 110 (refer to FIGS. 1A to 1C) in the manufacturing or cutting process of the DVD 100 when forming the groove track, the land track and the land pre-pit on the transparent substrate 110 or after forming those on the transparent substrate 110. Further, the emboss pit may be embossed on the groove track if the record signal is recorded on the groove track. Alternatively, the emboss pit may be embossed on the land track, if the record signal is recorded on the land track, or may be embossed on the groove and land tracks if the record signal is recorded on the groove and land tracks.

In FIG. 4, the record signal and the emboss pit are correlated (in synchronization) with each other, since the record signal is not a falsified one but is a proper one.

The 8 T mark is recorded where the emboss pit having the length of 4 T along the record track (hereinafter, it is simply referred to as the "4 T emboss pit") is formed. However, since the reflection light at the 8 T mark is decreased by the 8 T mark as well as the 4 T emboss pit, the RF signal is level-downed redundantly by the 8 T mark and the 4 T emboss pit, below the threshold level, which is used to convert the RF signal to the binary-coded signal and is indicated by a dotted line overlapped on the RF signal. Thus, the binary-coded signal related to the 8 T mark is not influenced by the existence of the 4 T emboss pit here.

In fact, in the example shown in FIG. 4, even if the emboss pit is not formed in synchronization with the record mark, the RF signal obtained at the record mark is decreased to the approximately lowest level due to the existence of the record mark itself. Thus, the RF signal at the 8 T mark below the threshold level is not substantially influenced by the existence of the 4 T emboss pit in this example. However, the RF signal at the 8 T mark may be further level-downed if the RF signal at the record mark is not decreased to the lowest level. In this case, the principle of the present embodiment is still valid since the further decrease of the RF signal at the 8 T mark due to the 4 T emboss pit is only related to the decrease of the RF signal below the threshold level as long as the record mark is in synchronization with the emboss pit. Thus, in this case, the binary-coded signal related to the 8 T mark is not influenced by the existence of the 4 T emboss pit, either.

The 8 T space is recorded where another 4 T emboss pit is formed. However, the decrease of the reflection light amount at the 8 T space due to the existence of the 4 T emboss pit is so small that the level-down amount of the RF signal due to the 4 T emboss pit is not enough to level-down the RF signal below the threshold level. Thus, the binary-coded signal related to the 8 T space is not influenced by the existence of the 4 T emboss pit.

Figure 5:
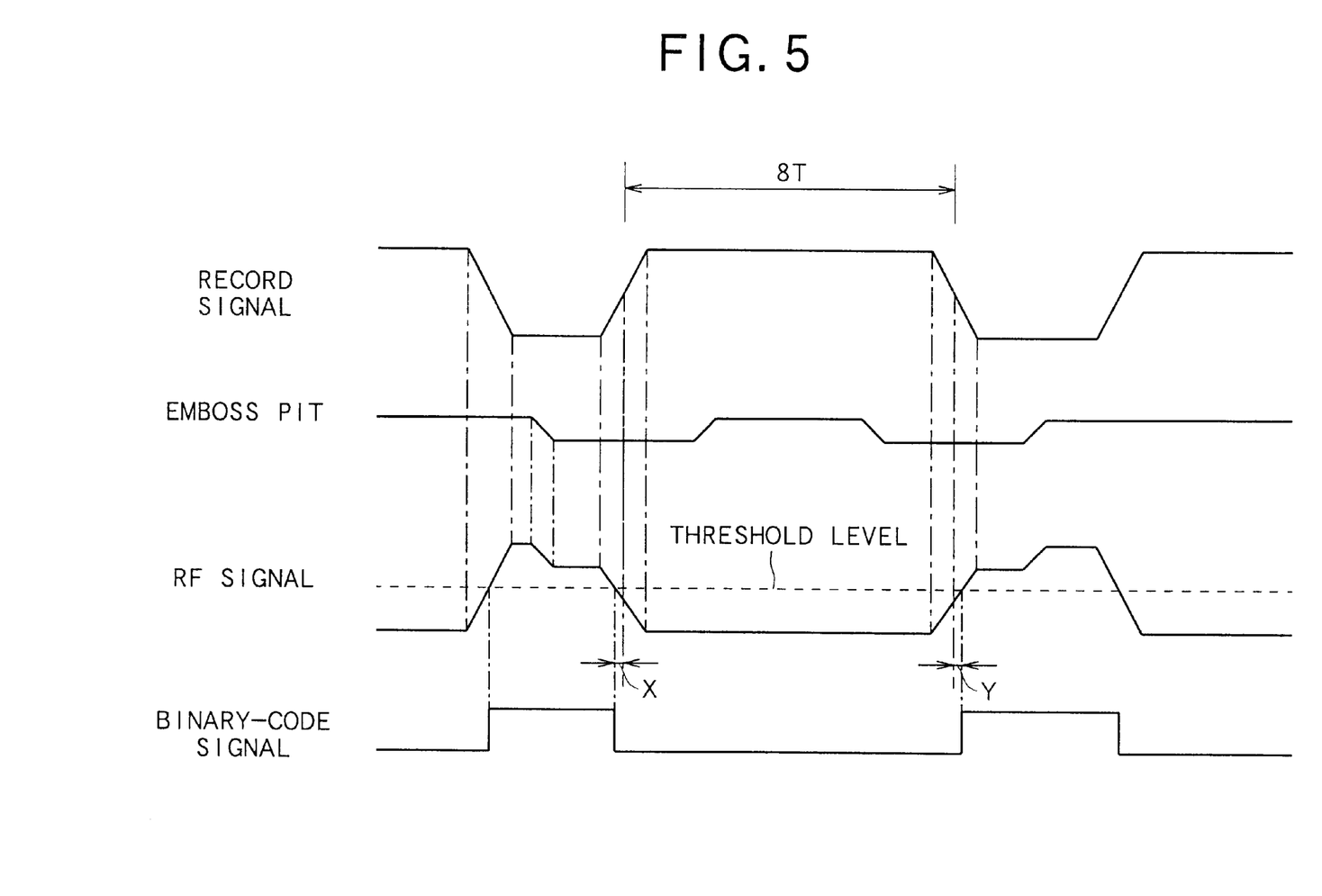
FIG. 5 is a timing chart in another operational example when falsified data is written in the example of FIG. 4.

FIG. 5 shows the signal waveforms of the record signal, the emboss pit, the RF signal and the binary-coded signal in such a condition that the emboss pit is formed in the same manner as the case of FIG. 4 while the record signal is falsified.

In FIG. 5, the record signal and the emboss pit are not correlated (in synchronization) with each other any more, since the record signal is falsified.

Since one edge of the 8 T mark (which represents the falsified record data) is located at one 4 T emboss pit and since another edge of the 8 T mark is located at another 4 T emboss pit, the reflection light at the 8 T mark is decreased at the vicinities of those edges by the existences of those 4 T emboss pits. Thus, the level of the RF signal with respect to the threshold level is significantly influenced by the existences of those 4 T emboss pits, resulting in that the binary-coded signal is significantly drifted as indicated by drift amounts X and Y in FIG. 5 with respect to the 8 T mark i.e., the falsified record signal.

As clearly understood from FIG. 4 and FIG. 5, according to the first embodiment, even if the record signal is falsified in the predetermined zone where the important data is recorded and is not desired to be falsified, the falsified record data cannot be normally read. Namely, the falsification of the record data is ended in vain. In this way, the protection of the record data in a certain zone can be improved since the falsification can be hardly performed there.

Figure 6:
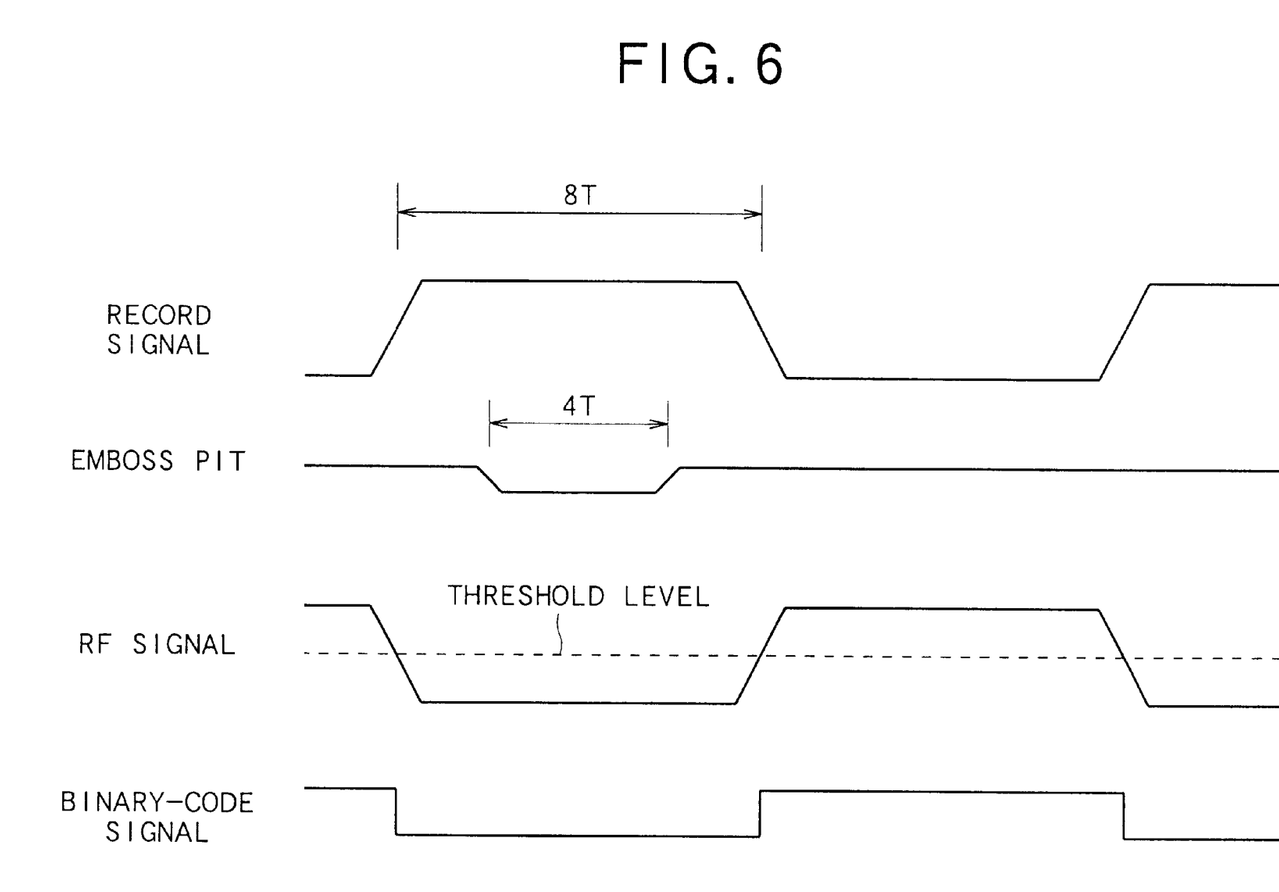
FIG. 6 is a timing chart in one operational example of the recording method in a second embodiment.

FIG. 6 shows the timing chart shown in FIG. 3A, in more detail, of the recording method in a second embodiment of the present invention.

Namely, in FIG. 6, the signal waveforms of the record signal, the emboss pit, the RF signal and the binary-coded signal in such a condition that the 4 T emboss pit is formed in the 8 T mark but is not formed in the record space are shown.

In FIG. 6, the record signal and the emboss pit are correlated (in synchronization) with each other, since the record signal is not a falsified one but is a proper one.

Although the 8 T mark is recorded over the 4 T emboss pit, since the reflection light at the 8 T mark is decreased by the 8 T mark as well as the 4 T emboss pit, the RF signal is level-downed redundantly by the 8 T mark and the 4 T emboss pit, below the threshold level. Thus, the binary-coded signal related to the 8 T mark is not influenced by the existence of the 4 T emboss pit here.

On the other hand, the space is recorded where no emboss pit is formed. Thus, the binary-coded signal related to the 8 T space is not influenced by the existence of any emboss pit here.

Figure 7:
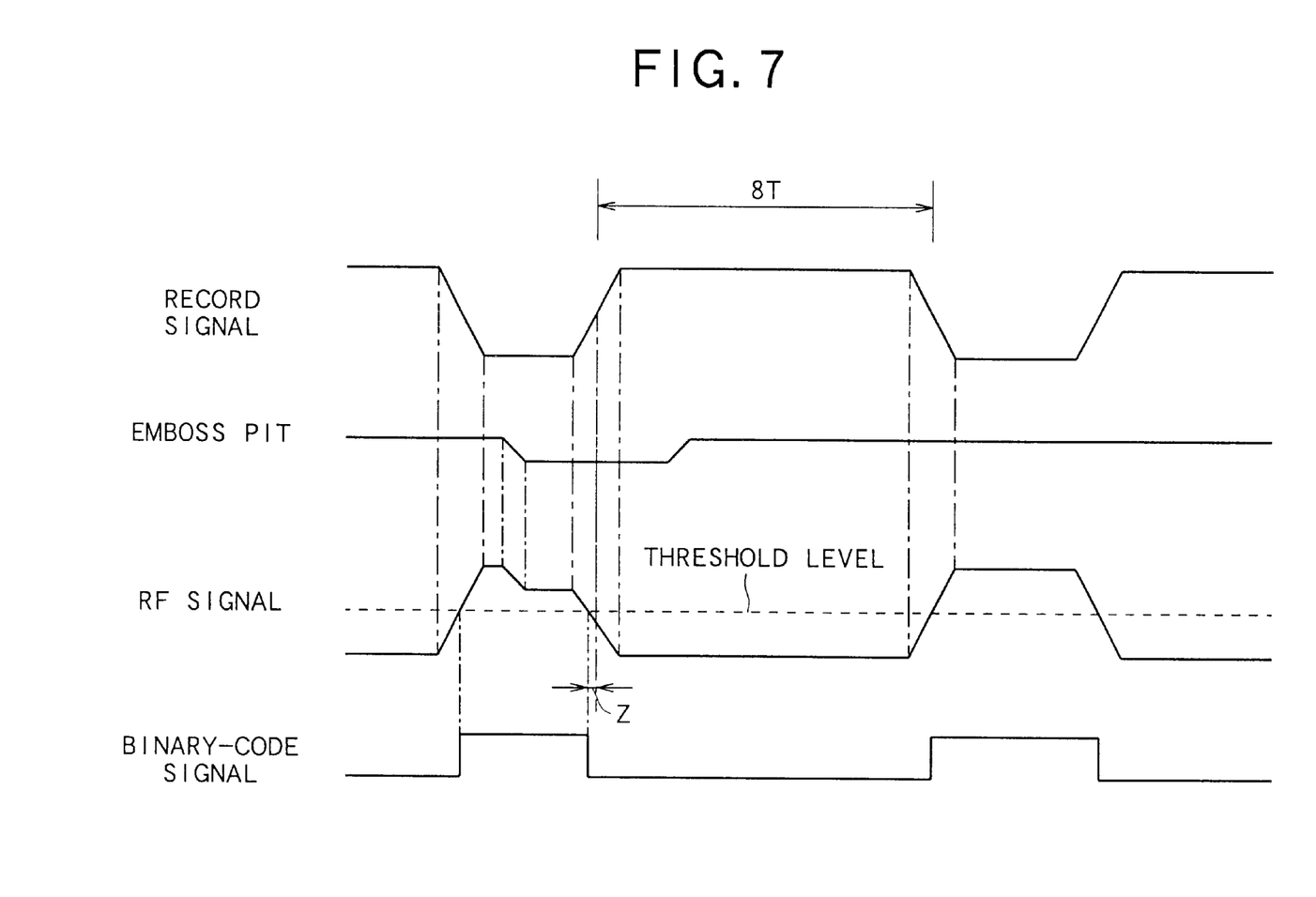
FIG. 7 is a timing chart in another operational example when falsified data is written in the example of FIG. 6.

FIG. 7 shows the signal waveforms of the record signal, the emboss pit, the RF signal and the binary-coded signal in such a condition that the emboss pit is formed in the same manner as the case of FIG. 6 while the record signal is falsified.

In FIG. 7, the record signal and the emboss pit are not correlated (in synchronization) with each other any more, since the record signal is falsified.

Since one edge of the 8 T mark (which represents the falsified record data) is located at the 4 T emboss pit, the reflection light at the 8 T mark is decreased at the vicinity of this edge by the existence of this 4 T emboss pit. Thus, the level of the RF signal with respect to the threshold level is significantly influenced by the existence of this 4 T emboss pit. Especially, in the second embodiment, since the RF signal is level-downed by the existence of the 4 T emboss pit below the threshold level, the binary-coded signal is quite significantly drifted as indicated by a drift amount Z in FIG. 7 with respect to the 8 T mark i.e., the falsified record signal.

In the second embodiment, since the emboss pit is not formed in the space, it is not necessary to set the depth of the emboss pit so that the level-downed RF signal due to the emboss pit at the space is above the threshold level as in the case of the first embodiment. Therefore, in the second embodiment, the depth of the emboss pit is preferably set deeper than that in the first embodiment, and is more preferably set deep enough to level-down the RF signal below the threshold level. By setting the depth in this manner, the emboss pit in synchronization with the 8 T mark functions quite effectively to drift the binary-coded signal if the record signal is falsified.

As clearly understood from FIG. 6 and FIG. 7, according to the second embodiment, even if the record signal is falsified in the predetermined zone where the important data is recorded and is not desired to be falsified, the falsified record data cannot be normally read. Namely, the falsification of the record data is ended in vain. In this way, the protection of the record data in a certain zone can be improved since the falsification can be hardly performed there.

Next, the method of recording the data on the DVD 100 is explained with reference to FIG. 8.

Figure 8:
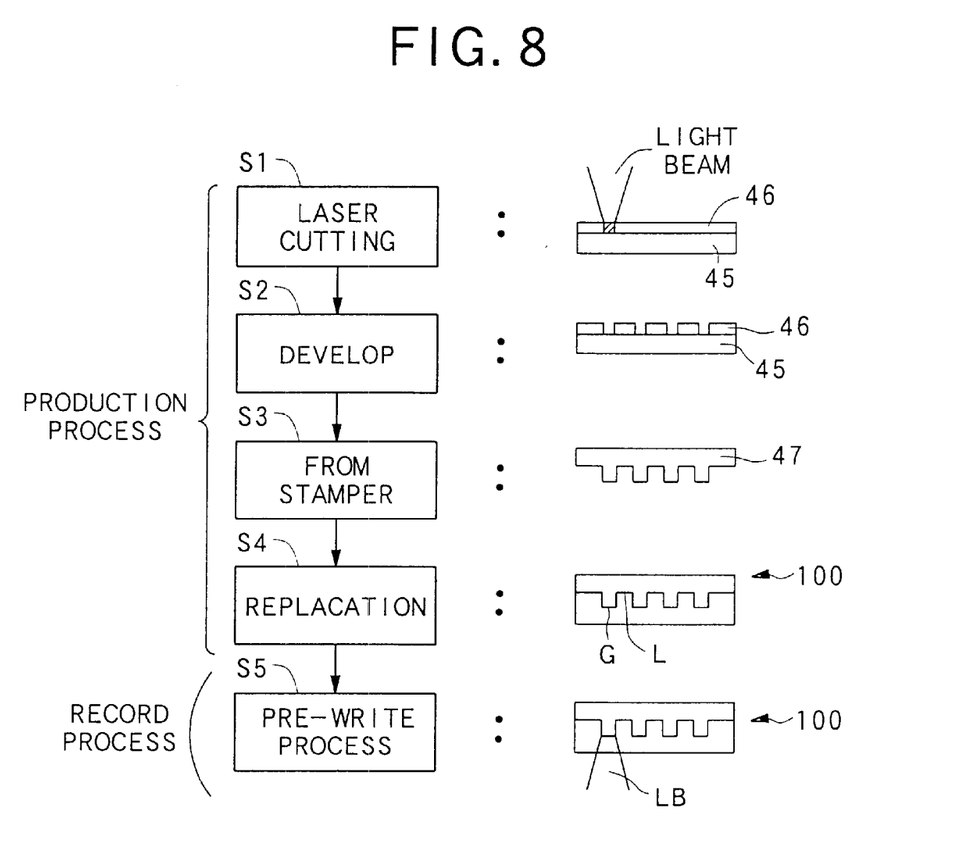
FIG. 8 is a process chart showing a method of recording data on the DVD of the embodiment.

As shown in FIG. 8, at first, a laser cutting process is performed. Namely, a photo-resist 46 is formed on a glass substrate 45 and is exposed by a light beam so as to form a pattern of the photo-resist 46 corresponding to the groove track G, the land track L and the land pre-pit LPP as well as the emboss pit (step S1). Then, the exposed photo-resist 46 is developed, so that the pattern of the photo-resist 46 is formed on the glass substrate 45 (step S2). Then, a stamper 47 (i.e., a so-called stamper disc) is formed by using this pattern of the developed photo-resist 46 (step S3). Then, the DVD 100 (e.g., the DVD-RW), which has the groove track G, the land track L and the land pre-pit LPP as well as the emboss pit, is replicated by using the stamper 47 (step S4). Then, a pre-write process is performed with respect to the DVD 100. Namely, the control data etc., are recorded on the control data zone etc., by the irradiation of the laser beam LB (step S5).

According to the present embodiment, in the production process of the DVD 100 at the steps S1 to S4, the predetermined data to be recorded at the pre-write process at the step S5 is known in advance. Thus, the emboss pit, which is in synchronization with the predetermined data to be recorded at the pre-write process at the step S5, is formed in the production process at the steps S1 to S4. Then, in the pre-write process S5 i.e., the record process before shipment, the predetermined data is recorded in synchronization with the emboss pit already formed at the production process at the steps S1 to S4. Therefore, after the pre-write process at the step S5 e.g., after the shipment or after the purchase of the DVD 100, even if it is attempted to falsify the predetermined data in the predetermined zone e.g., the control zone, the falsified data cannot be normally read out since the falsified data is not in synchronization with the emboss pit and is significantly influenced by the emboss pit (refer to FIG. 5 and FIG. 7).

As described above, according to the present embodiments, the emboss pit is formed (buried) so that the important data recorded in the control data zone cannot be illegally changed i.e., the important data recorded in this zone can be normally read out but the illegal rewriting or falsifying operation cannot be performed in this zone.

In the above described embodiments, the length of the data pattern i.e., the length of the record mark and/or the record space where the emboss pit is formed is not limited to 8 T. Also, the length of the emboss pit is not limited to 4 T. For example, it is possible to form the emboss pit having the length of 2 T along the record track with respect to the record mark and/or the record space each having the length of 4 T along the record track. In any event, the length of the emboss pit along the record track is shorter than that of the data pattern while the emboss pit is correlated with the data pattern.

Further, it is also possible that the length of the emboss pit along the record track (e.g., 1 T to 12 T) may be changed depending upon the length of the record mark and/or the record space along the record track (e.g., 3 T to 14 T). By this, since the edge margin between the emboss pit and the data pattern can be made constant for all the emboss pits, it is possible to perform the even more reliable data protection.

Furthermore, although such a case has been explained that the present invention is applied to the DVD-RW, it is also possible to apply the present invention to the DVD-R or the like, on which the data can be written only once.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.2000-007153 filed on Jan. 14, 2000 including the specification, claims, drawings and summary is incorporated herein by reference in its entirety.

What is claimed is:

1. A recordable optical disc comprising:
a disc substrate);
a record track formed on said disc substrate spirally or coaxially around a center of said disc substrate; and
an emboss pit formed in a predetermined zone on said disc substrate in correlation with predetermined data, which is recorded on said record track in the predetermined zone,
wherein said emboss pit is formed such that said emboss pit does not exist at a boundary between a record mark and a record space of the predetermined data.

2. A recordable optical disc according to claim 1, wherein said emboss pit is formed at a position where a length of a record mark of the predetermined data along the record track is equal to or longer than a predetermined length.

3. A recordable optical disc according to claim 2, wherein a length of said emboss pit is constant regardless of the length of the record mark.

4. A recordable optical disc according to claim 2, wherein a length of said emboss pit is variable depending upon the length of the record mark.

5. A recordable optical disc according to claim 1, wherein said emboss pit is formed at a position where a length of a record space of the predetermined data along the record track is equal to or longer than a predetermined length.

6. A recordable optical disc according to claim 5, wherein a length of said emboss pit is constant regardless of the length of the record space.

7. A recordable optical disc according to claim 5, wherein a length of said emboss pit is variable depending upon the length of the record space.

8. A recordable optical disc according to claim 1, wherein a plurality of emboss pits each having a structure same as the emboss pit are formed in the predetermined zone.

9. A recordable optical disc according to claim 8, wherein a first emboss pit of the emboss pits is formed at a position where a length of a record mark of the predetermined data along the record track is equal to or longer than a predetermined length and a second emboss pit of the emboss pits is formed at a position where a length of a record space of the predetermined data along the record track is equal to or longer than the predetermined length.

10. A recordable optical disc according to claim 9, wherein a length of said first emboss pit along the record track is variable depending upon the length of the record mark and a length of said second emboss pit along the record track is variable depending upon the length of the record space.

11. A recordable optical disc according to claim 8, wherein a length of each of the emboss pits along the record track is constant.

12. A recordable optical disc according to claim 1, wherein the predetermined zone is in a control data zone, and the predetermined data is control data to control a recording and/or reproducing operation of data recorded on said record track in a data record zone, which is different from the predetermined zone and where said emboss pit is not formed.

13. A recordable optical disc according to claim 12, wherein said control data zone is within a lead in area.

14. A recordable optical disc according to claim 1, wherein data other than the predetermined data is recorded on said record track in a data record zone, which is different from the predetermined zone and where said emboss pit is not formed.

15. A recordable optical disc according to claim 1, further comprising a record layer, which is formed on said disc substrate and by which data including the predetermined data is recorded on said record track.

16. A recordable optical disc according to claim 15, wherein said record layer comprises a material capable of a recording operation of write many times type.

17. A recordable optical disc according to claim 15, wherein said record layer comprises a material capable of a recording operation of write once type.

18. A recordable optical disc according to claim 15, wherein said record layer comprises a material capable of a recording operation of write limited times type.

19. A recordable optical disc according to claim 1, further comprising a reflective layer formed on said disc substrate for reflecting a light beam for a recording and/or reproducing operation of data recorded on the record track.

20. A method of recording data on a recordable optical disc comprising a disc substrate; a record track formed on said disc substrate spirally or coaxially around a center of said disc substrate; and an emboss pit formed in a predetermined zone on said disc substrate in correlation with predetermined data, which is recorded on said record track in the predetermined zone, wherein said emboss pit is formed such that said emboss pit does not exist at a boundary between a record mark and a record space of the predetermined data, said method comprising:

a process of forming the emboss pit on the disc substrate; and a process of recording the predetermined data in the predetermined zone.

21. A method according to claim 20, further comprising a process of recording data other than the predetermined data in a data record zone, which is different from the predetermined zone and where said emboss pit is not formed.

22. A recordable optical disc comprising:

a disc substrate;

a record track formed on said disc substrate spirally or coaxially around a center of said disc substrate; and an emboss pit formed in a predetermined zone on said disc substrate in correlation with predetermined data, which is recorded on said record track in the predetermined zone, wherein said emboss pit is formed at a position here a length of a record mark of the predetermined data along the record track is equal to or longer than a predetermined length.

23. A recordable optical disc according to claim 22, wherein a length of said emboss pit is constant regardless of the length of the record mark.

24. A recordable optical disc according to claim 22, wherein a length of said emboss pit is variable depending upon the length of the record mark.

25. A recordable optical disc comprising:

a disc substrate;

a record track formed on said disc substrate spirally or coaxially around a center of said disc substrate; and an emboss pit formed in a predetermined zone on said disc substrate in correlation with predetermined data, which is recorded on said record track in the predetermined zone, wherein said emboss pit is formed at a position where a length of a record space of the predetermined data along the record track is equal to or longer than a predetermined length.

26. A recordable optical disc according to claim 25, wherein a length of said emboss pit is constant regardless of the length of the record space.

27. A recordable optical disc according to claim 25, wherein a length of said emboss pit is variable depending upon the length of the record space.

28. A recordable optical disc comprising:

a disc substrate;

a record track formed on said disc substrate spirally or coaxially around a center of said disc substrate; and an emboss pit formed in a predetermined zone on said disc substrate in correlation with predetermined data, which is recorded on said record track in the predetermined zone, wherein a plurality of emboss pits each having a structure same as the emboss pit are formed in the predetermined zone, wherein a first emboss pit of the emboss pits is formed at a position where a length of a record mark of the predetermined data along the record track is equal to or longer than a predetermined length, and wherein a second emboss pit of the emboss pits is formed at a position where a length of a record space of the predetermined data along the record track is equal to or longer than the predetermined length.

29. A recordable optical disc according to claim 28, wherein a length of said first emboss pit along the record track is variable depending upon the length of the record mark and a length of said second emboss pit along the record track is variable depending upon the length of the record space.

30. A recordable optical disc according to claim 28, wherein a length of each of the emboss pits along the record track is constant.

\* \* \* \* \*